C. T. FAIRCHILD.
DRYING APPARATUS.
No. 173,605.        Patented Feb. 15, 1876.
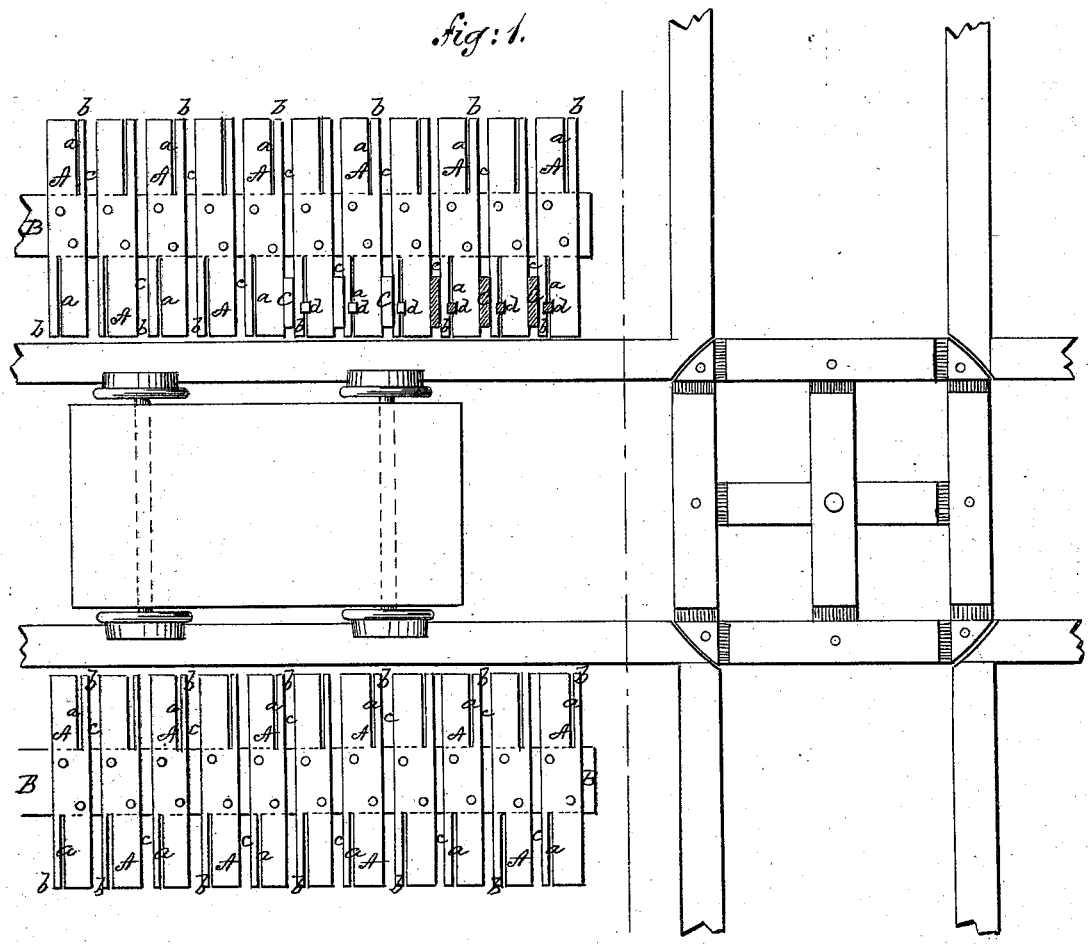
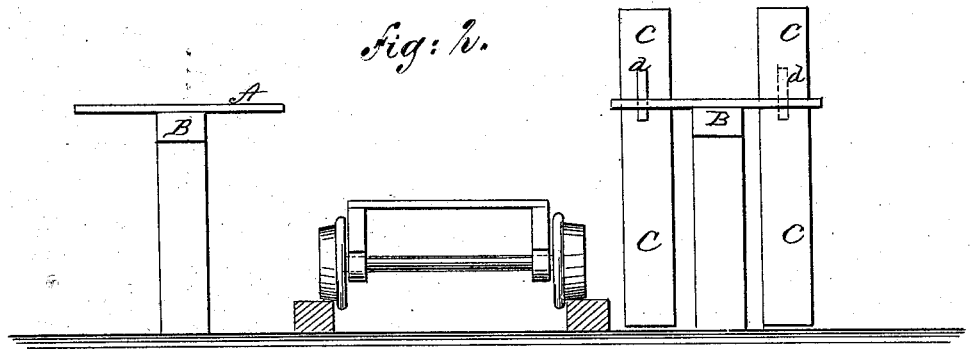

UNITED STATES PATENT OFFICE.

CURTISS T. FAIRCHILD, OF SALISBURY, NEW YORK.

IMPROVEMENT IN DRYING APPARATUS.

Specification forming part of Letters Patent No. 173,605, dated February 15, 1876; application filed January 24, 1876.

*To all whom it may concern:*

Be it known that I, CURTISS T. FAIRCHILD, of Salisbury, in the county of Herkimer and State of New York, have invented a new and useful Improvement in Drying Cheese-Box Hoops, &c.; and that the following is a full, clear, and exact description of the same, reference being had to the accompanying drawings, and to the letters of reference marked thereon, making a part of this specification.

This invention is in the nature of an improvement in racks for drying cheese-box hoops and other similar articles; and the invention consists in racks for drying cheese-box rims, constructed of a series of wooden cleats, provided with slots and wedges, whereby the cheese-box hoops or other articles that are being dried are confined between the cleats and prevented from being blown or otherwise disturbed from their position, constructed, combined, and arranged in the manner hereinafter described and shown.

In the accompanying sheet of drawings, Figure 1 is a plan or top view of my invention, and Fig. 2 a cross-section of same.

Similar letters of reference indicate like parts in the several figures.

A represents a series of cleats, which are firmly secured at right angles to one or more supporting-rails, B. Each of these strips has formed in it, near their ends and at opposite sides, saw kerfs or slots $a$, forming tongues $b$, and they are attached to the supporting-rail B so that a space, $c$, is left between each of the cleats. The cheese-box hoops, &c., C, that it is intended to dry are placed perpendicularly, one in each space $c$, the lower end of the hoop resting on the ground and the upper end passing into the space $c$, when the tongues $b$ formed by the saw kerfs or slots $a$ act as springs, holding the hoops, &c., in place, so that they will not be disturbed by the wind or any ordinary accident. When, from use and exposure, these tongues lose elasticity, wedges $d$ may be inserted into the kerfs $a$, which will force out the tongues $b$ against the hoops which are placed in contact with them.

A series of these drying-cleats are preferably arranged in parallel rows, with a rail-track between them, on which a small platform-car may be operated, so that the cheese-box hoops or other articles to be dried can be quickly loaded and unloaded from the cars. The rail-track and car, however, are not essential to the proper working of my drying-racks, since, as is apparent, they may be used with any convenient means of transporting the material to be dried, or without it, as desired.

Having thus described my invention, what I claim as new, and desire to secure by Letters Patent, is—

Racks for drying cheese-box hoops, consisting of a series of cleats, with saw-kerfs formed therein, and combined with wedges, substantially as and for the purpose described.

CURTISS T. FAIRCHILD.

Witnesses:
 WATTS T. LOOMIS,
 C. VAN VECHTEN.